United States Patent
Bruke

[11] Patent Number: 6,096,201
[45] Date of Patent: Aug. 1, 2000

[54] APPARATUS FOR SEPARATION

[75] Inventor: Richard L. Bruke, Bunkeflostrand, Sweden

[73] Assignee: Spirac Engineering AB, Malmo, Sweden

[21] Appl. No.: 09/269,625

[22] PCT Filed: Oct. 7, 1997

[86] PCT No.: PCT/SE97/01681

§ 371 Date: Mar. 30, 1999

§ 102(e) Date: Mar. 30, 1999

[87] PCT Pub. No.: WO98/15335

PCT Pub. Date: Apr. 16, 1998

[30]   Foreign Application Priority Data

Oct. 7, 1996   [SE]   Sweden ................................. 9603689

[51] Int. Cl.$^7$ ............................. E02B 5/08; B01D 29/31; B01D 29/64; B01D 29/94
[52] U.S. Cl. ......................... 210/155; 210/159; 210/162; 210/314; 210/415
[58] Field of Search ................................... 210/159, 162, 210/295, 314, 413, 415, 155

[56]   References Cited

U.S. PATENT DOCUMENTS

| | | |
|---|---|---|
| 5,034,122 | 7/1991 | Wiesemann . |
| 5,061,380 | 10/1991 | Stevenson . |
| 5,078,865 | 1/1992 | Huber . |
| 5,372,713 | 12/1994 | Huber ........................................ 210/158 |
| 5,755,958 | 5/1998 | Huber . |
| 5,840,180 | 11/1998 | Filion . |

FOREIGN PATENT DOCUMENTS

| | | |
|---|---|---|
| 0565898 | 10/1993 | European Pat. Off. . |
| 0640370 | 3/1995 | European Pat. Off. . |
| 3138674 | 6/1982 | German Dem. Rep. . |
| 3122131 | 12/1982 | Germany . |
| 89059638 | 8/1989 | Germany . |
| 3920196 | 1/1991 | Germany . |
| 4143376 | 4/1993 | Germany . |
| 4302849 | 8/1993 | Germany . |
| 4211659 | 10/1993 | Germany . |
| 457637 | 1/1989 | Sweden . |
| 9519212 | 7/1995 | WIPO . |

OTHER PUBLICATIONS

English Abstract of SE 457,637 of Jan. 16, 1989.
English Abstract of EP 0640370 Mar. 1, 1995.
English abstract of EP 0565898.
English Abstract of DE 3122131.

*Primary Examiner*—Thomas M. Lithgow
*Attorney, Agent, or Firm*—Ladas & Parry

[57]   ABSTRACT

An apparatus for separating bodies from a flowing liquid in which the apparatus includes a rotary conveyor helix (3) which is disposed at an angle with the horizontal and has a lower portion (10) which forms a screening device (40) and an upper portion where discharge takes place of material which has been displaced by the conveyor helix (3) from the screening device to the upper portion. At least one extra screening device (70) is disposed adjacent to the first screening device (40) for lateral transport to the first screening device of material which has been entrapped by the extra screening device.

14 Claims, 10 Drawing Sheets

APPARATUS FOR SEPARATION

FIELD OF THE INVENTION

The present invention relates to an apparatus for separation and displacement of bodies, particles and/or similar impurities from a liquid.

BACKGROUND AND PRIOR ART

The term bodies, particles and/or similar impurities is taken in this description to signify all material which, when it is located in a liquid, comes to rest against a separation apparatus, for example a grid or a screen through which the liquid passes. An expression which occurs often for such material is "screenings", consequently, in the continuation of this description, the expression screenings will often be employed for the above-defined matter. The designation "solid substances" also occurs but will be employed in this description generally exclusively for screenings in which the liquid content has been reduced.

In, for example, water treatment plants, in process industries such as pulp factories or paper mills, in food industries, such as slaughter houses, etc., there is a need to be able to remove from liquids bodies and particles and/or similar impurities.

When the screenings have been displaced of out of the liquid, the liquid content of the screenings is high. The total solids is generally less than 5–8%. There is, therefore, a need in the art to be able to reduce the liquid content in the screenings in order to facilitate its continued handling. In total solids contents exceeding 20%, the continued handling of the screenings is substantially facilitated. In cases when the screenings are incinerated, for example in municipal heating plants, even higher total solids contents are naturally extremely desirable, since this entails improved energy yield on combustion.

A further need in the art is that the screenings be freed of soluble, for example biological compounds included in the screenings. This applies particularly to screenings sent to landfill deposition.

From Swedish patent No. 457 637 and German Gebrauchmuster No. G 8905963, there are previously known apparatuses for removing solid bodies and material from a flowing liquid. These documents describe an obliquely upwardly inclined conveyor screw installed in a channel with flowing liquid containing bodies of solid matter. The conveyor screw is disposed in a path which, in its lower region, forms a part-cylindrical screen surface. Above the water surface, the path is designed as a tube or casing surrounding the conveyor screw. In its upper end, the casing is provided with a discharge aperture. In the region ahead of the discharge aperture, the threads of the conveyor screw are of reducing pitch, whereby a certain compression and dewatering take place of the matter being upwardly transported. However, capacity in these apparatuses is extremely low.

Apparatuses of the above described type are employed for mechanical treatment of restricted flows of municipal waste water, treatment plants or for purifying (screening) polluted liquids, for example water within industries such as paper mills, food industries and slaughter houses.

The equipment in existence suffers from a plurality of well known drawbacks and functional problems.

Thus, the upward conveyance of matter which has accumulated on the screening surface is unreliable. When the conveyor screw is designed as a conveyor helix, the screenings are readily washed down through the centre hole of the helix. Another well known drawback in the employment of the conveyor screw with a mechanical centre shaft is that the screenings adhere to the mechanical shaft and to the helical thread and rotate together with these, which greatly obstructs the conveyance function.

It will readily be perceived that, as a result of these inconveniences, the capacity of the equipment is reduced at the same time as such equipment requires manual supervision. In order, to some extent, to improve the conveyance function, it is known in the art to limit the angle of inclination of the conveyor helix. However, this leads to bulky designs and constructions and consequentially increased costs.

A serious drawback in the prior art technique is that the diameter of the conveyor helix is determined by the maximum liquid flow for which the apparatus is to be dimensioned, since the diameter of the conveyor helix is determined by the radius of curvature of the screen surface. Hence, large liquid flows require large diameters of the conveyor helix, which entails unwieldy and expensive designs and constructions. In large variations of the flow, the average degree of efficiency in prior art apparatuses is low. This circumstance is the immediate reason why apparatuses of the type described here have only come into use in relatively limited maximum flows, seldom above 100–125 l/s.

German patent application 94113084.1 describes an apparatus with two cooperating screen surfaces, which implies that the above-described drawbacks are partly obviated. However, the apparatus described in the patent document suffers from the drawback that the increased screen surface is, in its effective extent, restricted unless the construction is made extremely space-demanding and expensive. The reason is that they, according to the description, are oriented parallel with the inclining screen/upward conveyance apparatus. The increased screen surface also requires that the supply channel be expanded in the area of the screen surface.

Known embodiments of apparatuses described here also function unsatisfactorily as regards the reduction of the liquid content in the screenings, since there is no possibility in such apparatuses for control and regulation of the size of the amount of liquid which is removed from the screenings, and thereby also the possibility of controlling and regulating the total solids in the screenings which leave the apparatuses. One known drawback is that discharge of the screenings out of the conveyor path takes place using force of gravity, in other words reliance is placed on the matter falling out through the discharge opening under the influence of gravity. This technique entails that it is not uncommon that the discharge opening becomes entirely jammed.

Hitherto, the only demonstrated method of attempting to control the degree of compression and thereby the dewatering efficiency is to vary the length of the "unthreaded" compression space ahead of the discharge opening, i.e. to increase or reduce the length of the "friction plug" which is formed by the conveyed matter. The difficulty in attempting, in this manner, to control the degree of dewatering is obvious, since, in practice, the quantity of screenings per unit of time varies dramatically (the matter "dries" more or less when remaining for varying periods of time during which it is subjected to compression).

SUMMARY OF THE INVENTION

The present invention relates to an apparatus in which the above-outlined drawbacks have been obviated. This is attained by means of the apparatus according to the invention in which an extra screening device is provided adjacent to a lower portion of an inclined main screening device to supply to the main screening device with matter entrapped by the extra screening device.

BRIEF DESCRIPTION OF THE DRAWING FIGURES

The present invention will be described in greater detail hereinbelow with reference to a number of Figures, in which.

Figure 3:
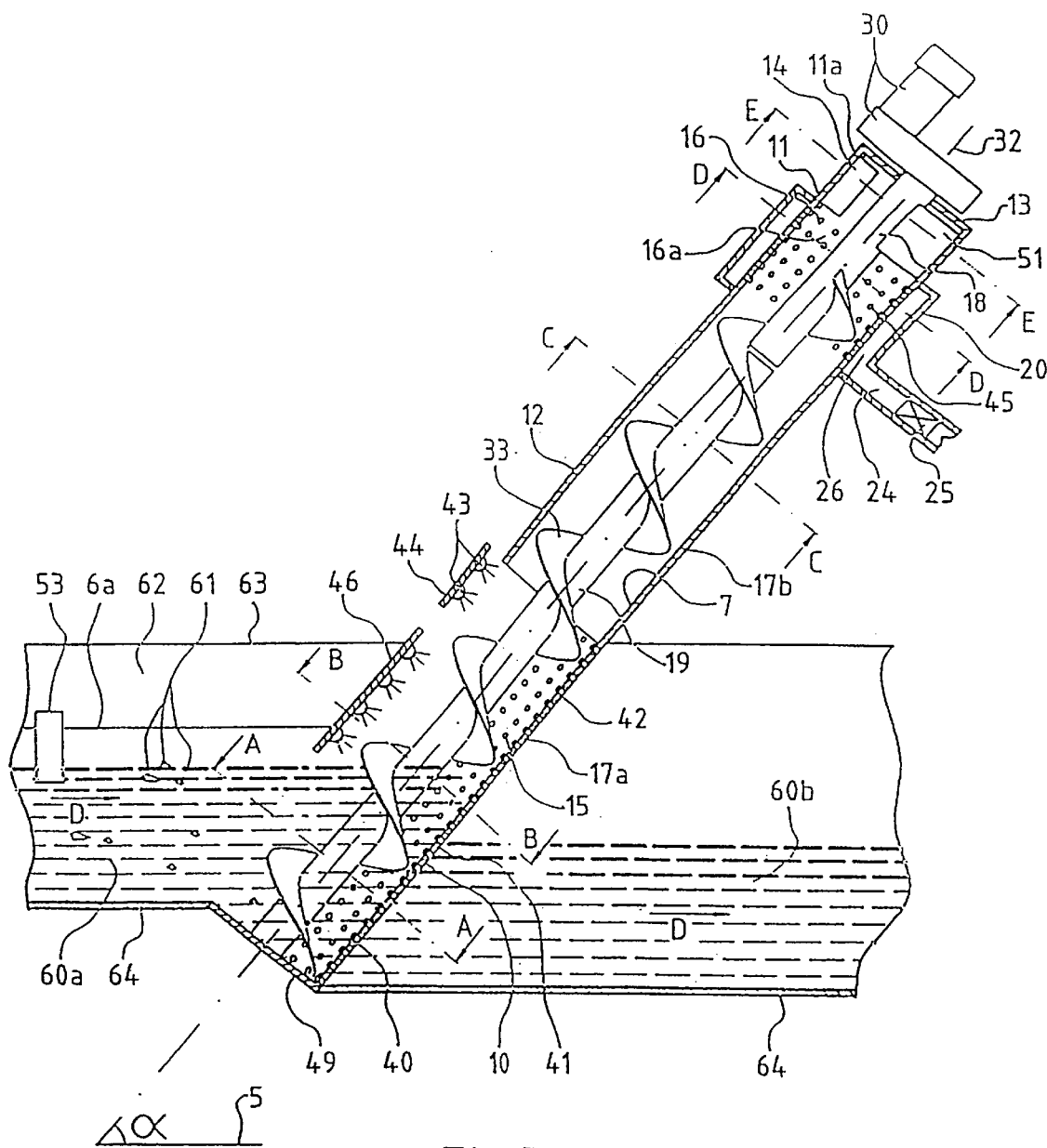
FIG. 3 is a longitudinal section through a second embodiment of the apparatus placed in a channel.
Figure 3A:
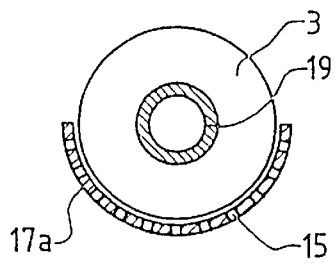
Figure 3B:
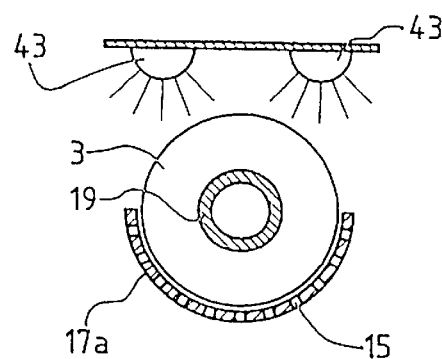
Figure 3C:
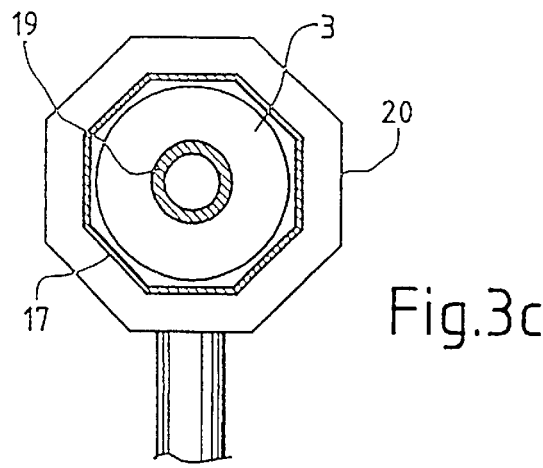
Figure 3D:
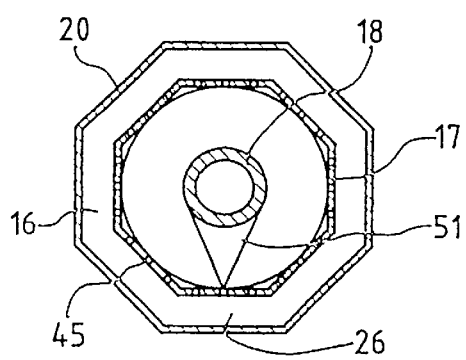
Figure 3E:
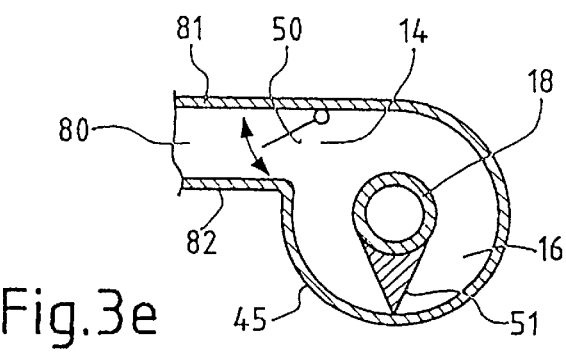
Figure 4:
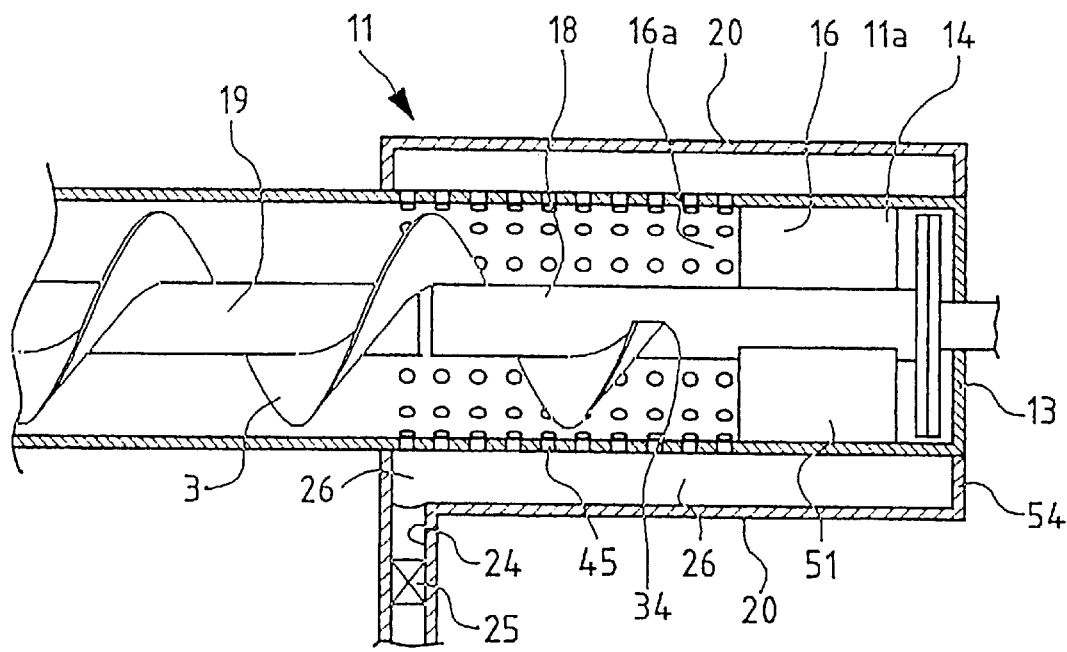
Figure 5:
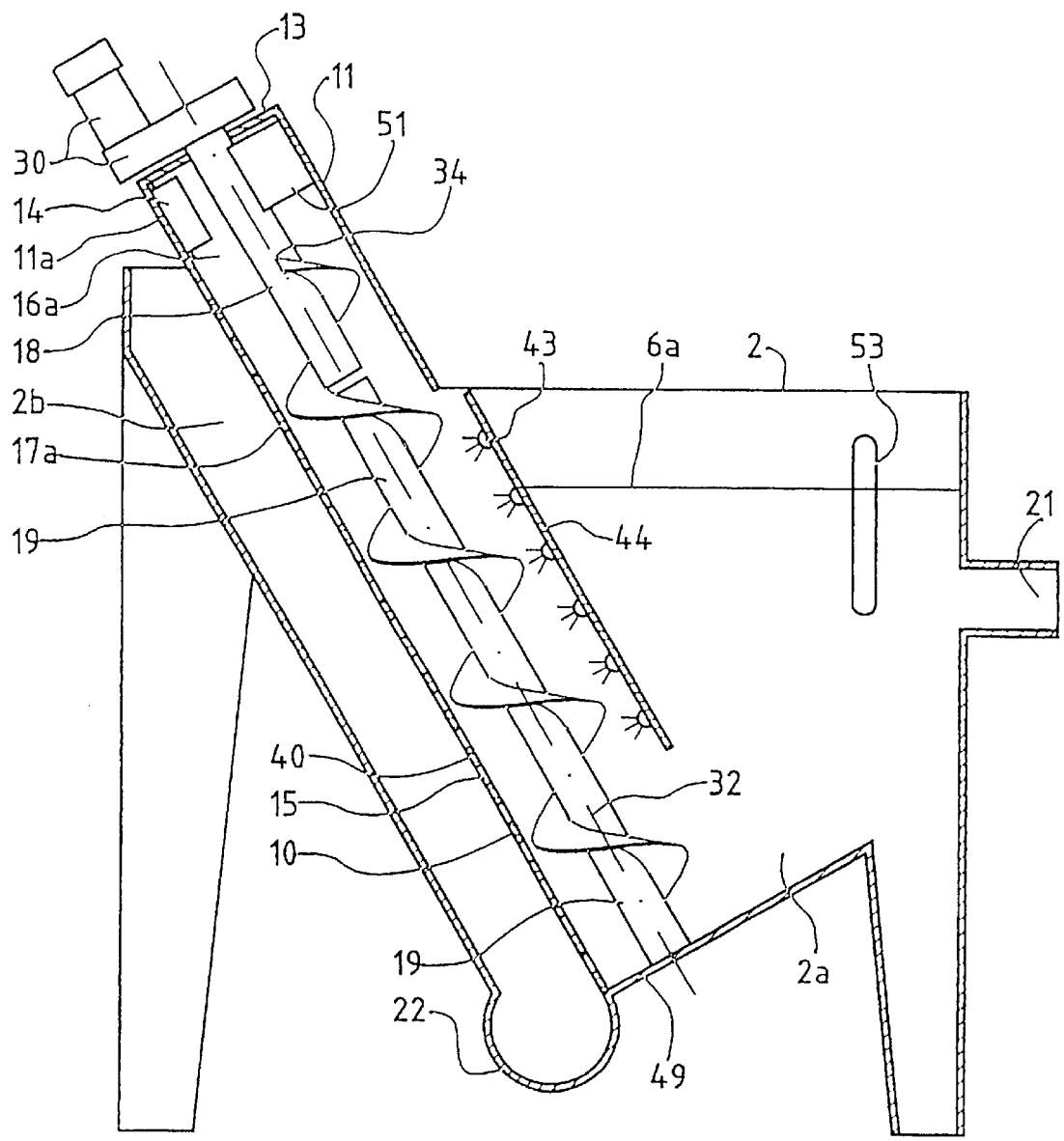
Figure 6B:
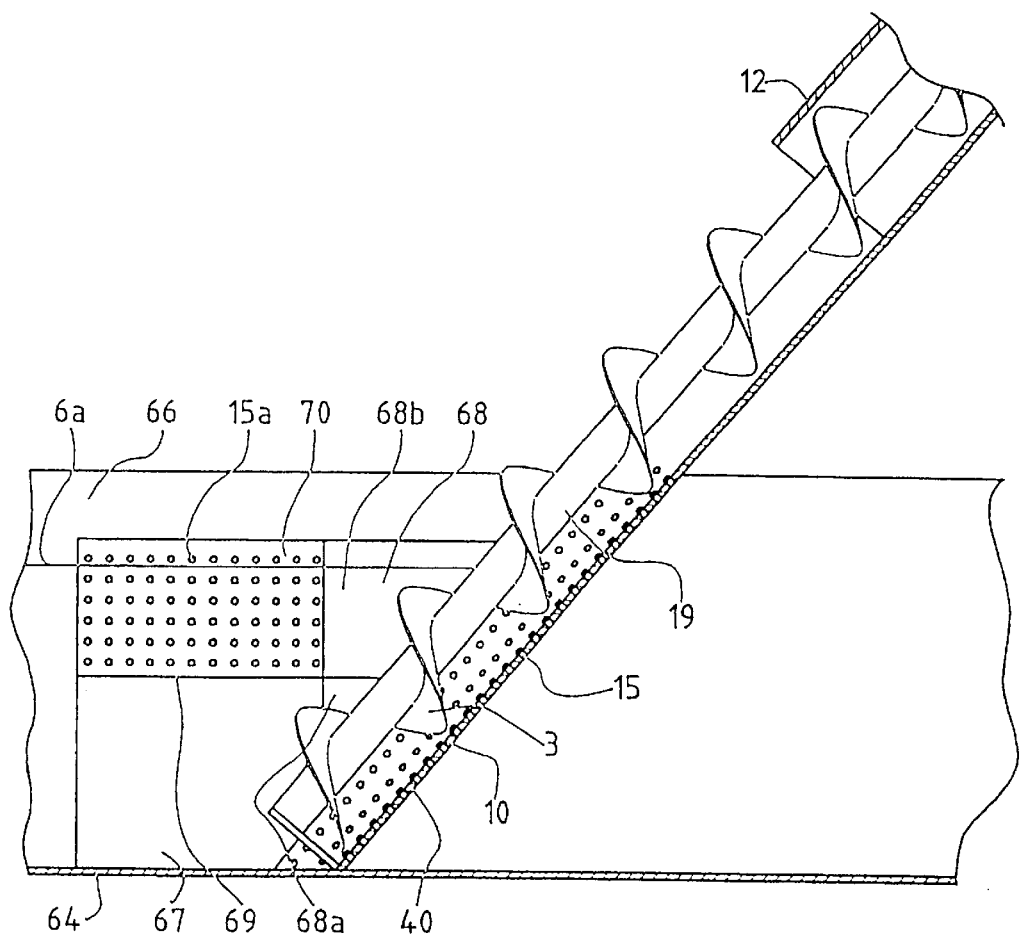
Figure 6A:
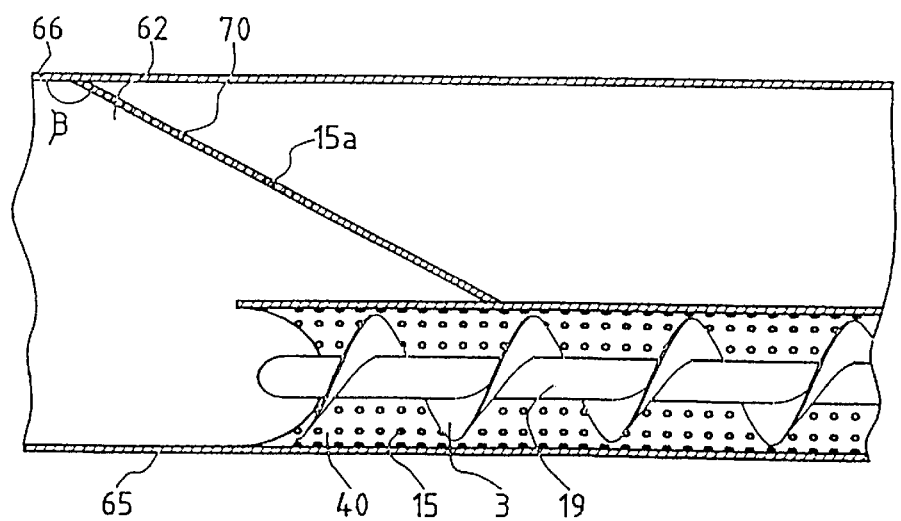
Figure 7B:
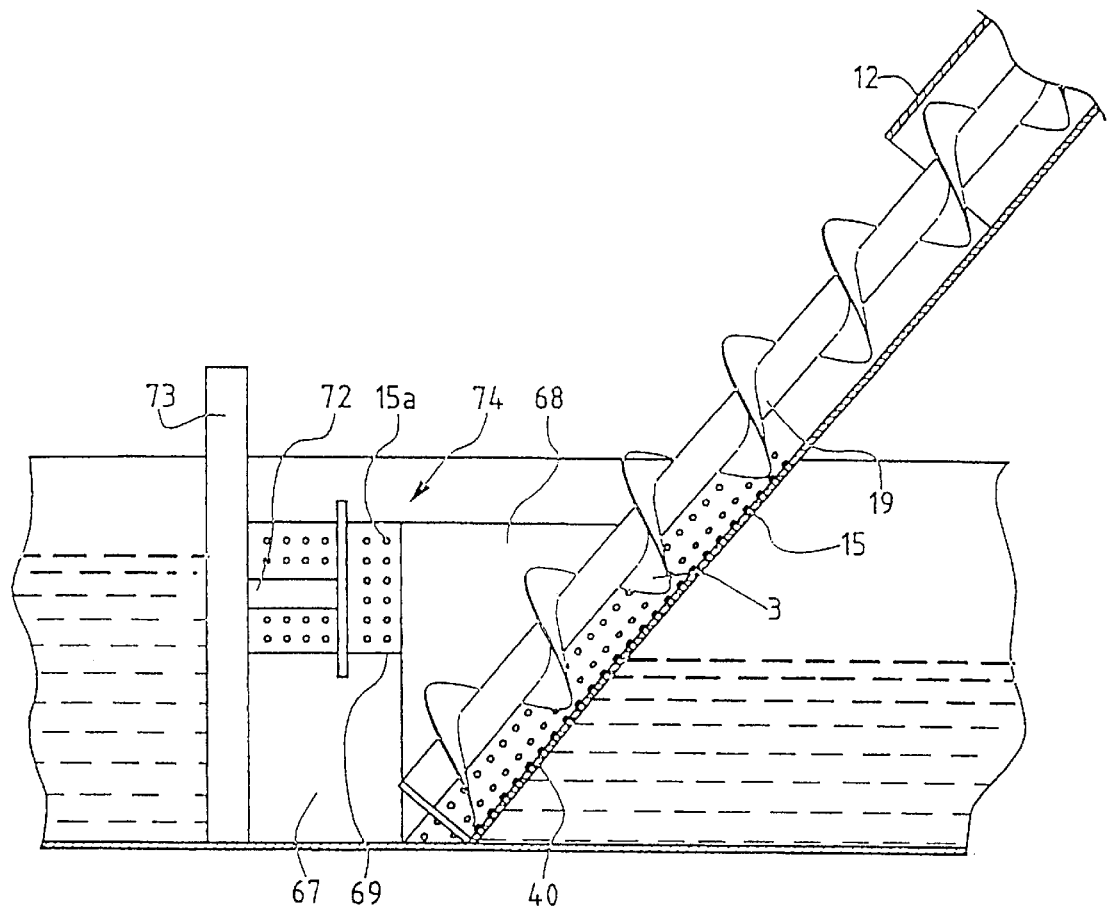
Figure 7A:
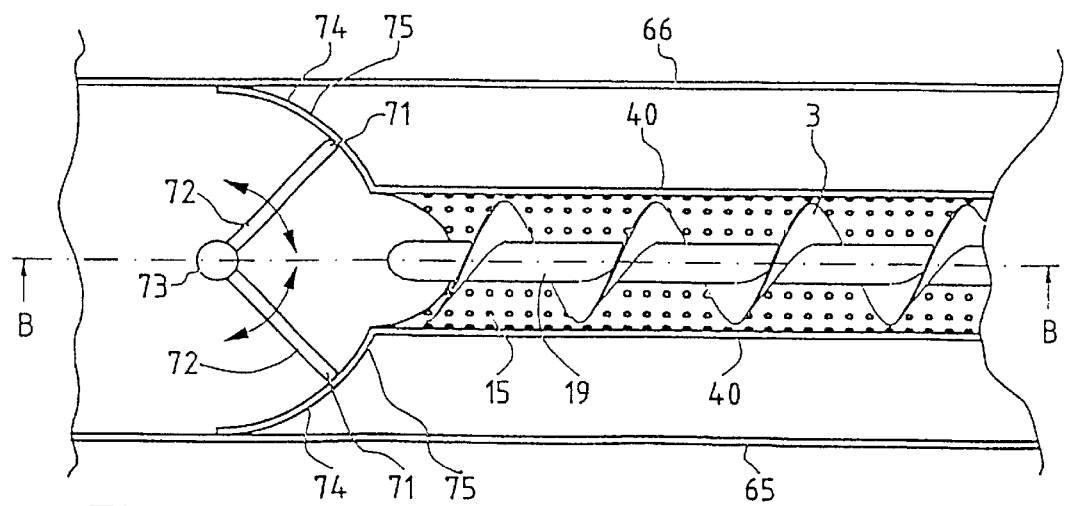
Figure 8B:
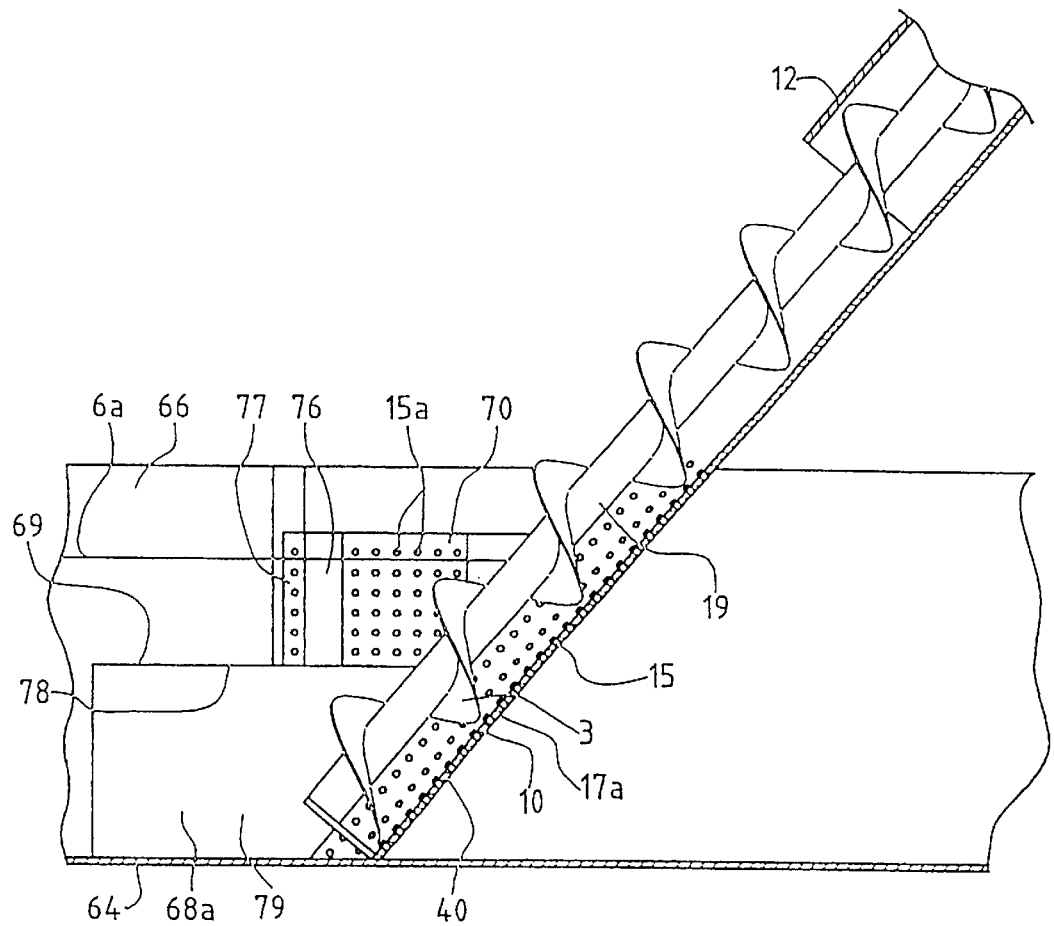
Figure 8A:
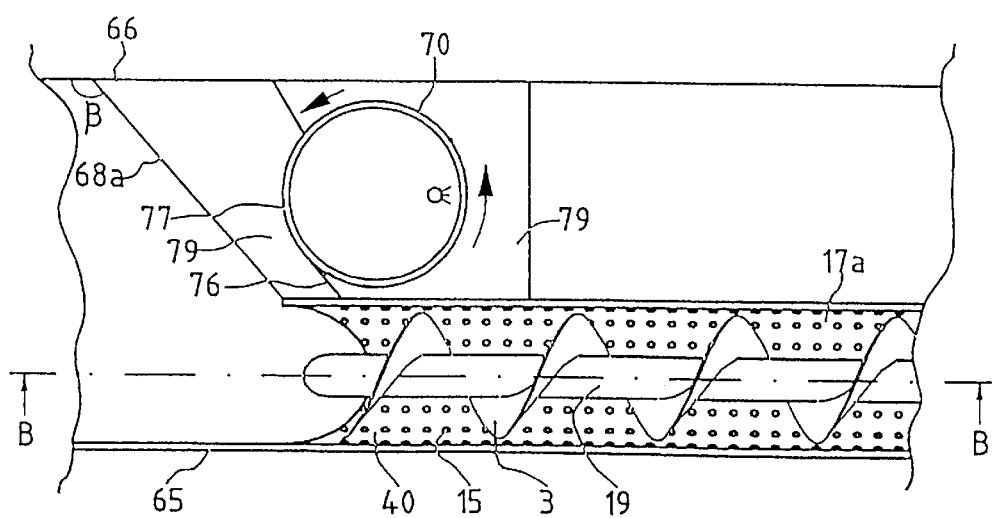

FIGS. 3a–e show cross sections taken along the lines A—A, B—B, C—C, D—D, and E—E in FIG. 3;

FIG. 4 shows the upper end portion of the apparatus according to FIG. 3 in greater detail;

FIG. 5 is a longitudinal section through the apparatus in one embodiment in which it is placed in a container;

FIG. 6a is a top plan view of one embodiment of the apparatus with a laterally placed extra screen section;

FIG. 6b shows the section taken along the line B—B in FIG. 6a;

FIG. 7a is a top plan view of a second embodiment of the apparatus with a laterally placed extra screen section;

FIG. 7b is a section taken along the line B—B in FIG. 7a;

FIG. 8a is a top plan view of a third embodiment of the apparatus with a laterally placed extra screen section; and FIG. 8b shows a section taken along the line B—B in FIG. 8a.

DETAILED DESCRIPTION

The Figures illustrate one embodiment of an apparatus for removing bodies and/or particles from a flowing liquid 60. The apparatus includes a lower portion 10 including a screen device 40 and an upper portion 11 including a discharge portion 11a. As a rule, the apparatus also includes an intermediate portion 12 which forms a conveyor device 12 between the lower portion 10 and the upper portion 11. A conveyor helix 3 is disposed in a path 7 which is formed by the lower portion, the upper portion and the intermediate portion (in those embodiments in which the intermediate portion is included). Drive means 30 are disposed at the upper region of the apparatus. The screen device 40, the intermediate portion 12 and the upper portion 11 from a screen and conveyor device which separates the bodies and/or particles from the liquid and displaces the screenings formed on separation to the upper region of the apparatus.

The conveyor helix consists of a helical thread blade 33. The term thread blade has here been employed without any restrictive import and comprises a helical body whose cross section is, for example, rectangular, conical, trapezoidal, ziggurat-shaped defining surfaces, etc. The term thread blade may also be taken to refer to a body which is composed of two or more mutually interconnected part helices. The helical thread blade is designated hereinafter generally as "shaftless helix" 33 or "helix" 33.

The prime mover 30 is disposed to rotate the shaftless helix 33 about its geometric centre axis 32. The path 7 and the geometric centre axis 32 of the helix make an angle a with the horizontal plane 5. The intermediate portion 12 and the upper portion 11 are designed with a casing 17 which, with a certain play, surrounds the helix 3. Hereinafter, the designation first casing 17 will often be employed. The first casing 17 is of substantially cylindrical design. In both portions, the casing has a cross section which generally includes at least one corner. In the region of the discharge device 51, described below, the casing is generally provided with a substantially circular cross section.

The screen device 40 comprises a first portion 41 located beneath the calculated highest liquid level 6a of the liquid which is fed to the inlet portion of the screen device, and a second portion 42 located above the calculated highest liquid level 6a.

The wall 17a of the screen device forms a screen surface which is provided with passages 15 for liquids. The dimensions of the passages are adapted to the size of those bodies, particles and/or similar impurities 61 which are to be separated from liquid passing through the screen device.

The cross section of that portion of the path which the screen device 40 forms (cf. FIG. 1a) and the outer radius of the helix are adapted to one another such that, in those portions of the screen device 40 where the helix abuts against the wall 17a of the screen device, this forms a curved surface with a radius of curvature which, in the circumferential direction, substantially coincides with or exceeds the outer radius of the helix.

In certain embodiments, a displaceable casing half 17b (cf. FIG. 1b) is disposed in the region of the second portion 42. The casing half generally has a cross section which corresponds to the cross section of the upper half of the first casing 17 in the intermediate portion 12 of the apparatus. The casing half 17b in cooperation with the wall 17a of the screen device substantially surrounds the helix 3 in the lower portion 10 of the apparatus.

The casing half 17b is generally displaceable in the axial direction of the apparatus. The displacement of the casing half is preferably automatically regulated in such a way that its lower edge is always located in the region of the surface of the incoming liquid, i.e. above, in or below the surface. The displacement of the casing half is normally controlled with the aid of a level sensor 53 which senses the level of the liquid flowing in towards the screen device. The displacement of the casing in the axial direction of the apparatus is normally controlled such that the casing half in cooperation with the screen device substantially surrounds the entire length of the helix, between the liquid surface and the casing 17 of the intermediate portion 12.

In certain embodiments, the casing half 17b is provided with outlet means 43 for liquid. The outlet means comprise nozzles 43 which are directed towards the wall 17a of the screen device. The nozzles are preferably disposed in two discrete rows which are substantially parallel with the geometric centre axis 32 of the helix.

In embodiments of the invention where the apparatus is provided with means (not shown on the Drawings) which switch the direction of rotation of the helix 3, control devices are normally included which only permit the one row of nozzles to emit liquid jets, namely that row whose nozzles, in the relevant direction of rotation, direct their liquid jets towards the drive side of the screen device 40. The term "drive side" is here taken to signify that area of the screen device along which the major portion of the conveyed matter is displaced on rotation of the helix.

In embodiments which lack the casing half 17b, the nozzles 43 are, in certain versions, disposed on brackets 44

(cf. FIG. 3 below) which are generally displaceable in the longitudinal direction of the apparatus for moving the outlet devices 43 according as the liquid level varies. A number of the highest-located brackets generally have a fixed position and form an upper portion 44 of brackets whose liquid jets are directed towards the upper region of the second portion 42 of the screen device. The remaining brackets form a lower, movable section 46 of brackets which, during reciprocal movement, emit liquid jets directed at the wall 17a of the screen device above the liquid surface and thereby at any possible screenings located above the liquid surface. Hereby, the outlet devices 43 emit liquid which pours over the screenings irrespective of where the screenings are located in the region between the liquid surface and the intermediate portion. The guide device and detector 53 adapt the extent of the reciprocating movement to the relevant level of the liquid flowing in towards the screen device 40.

Figure 1:
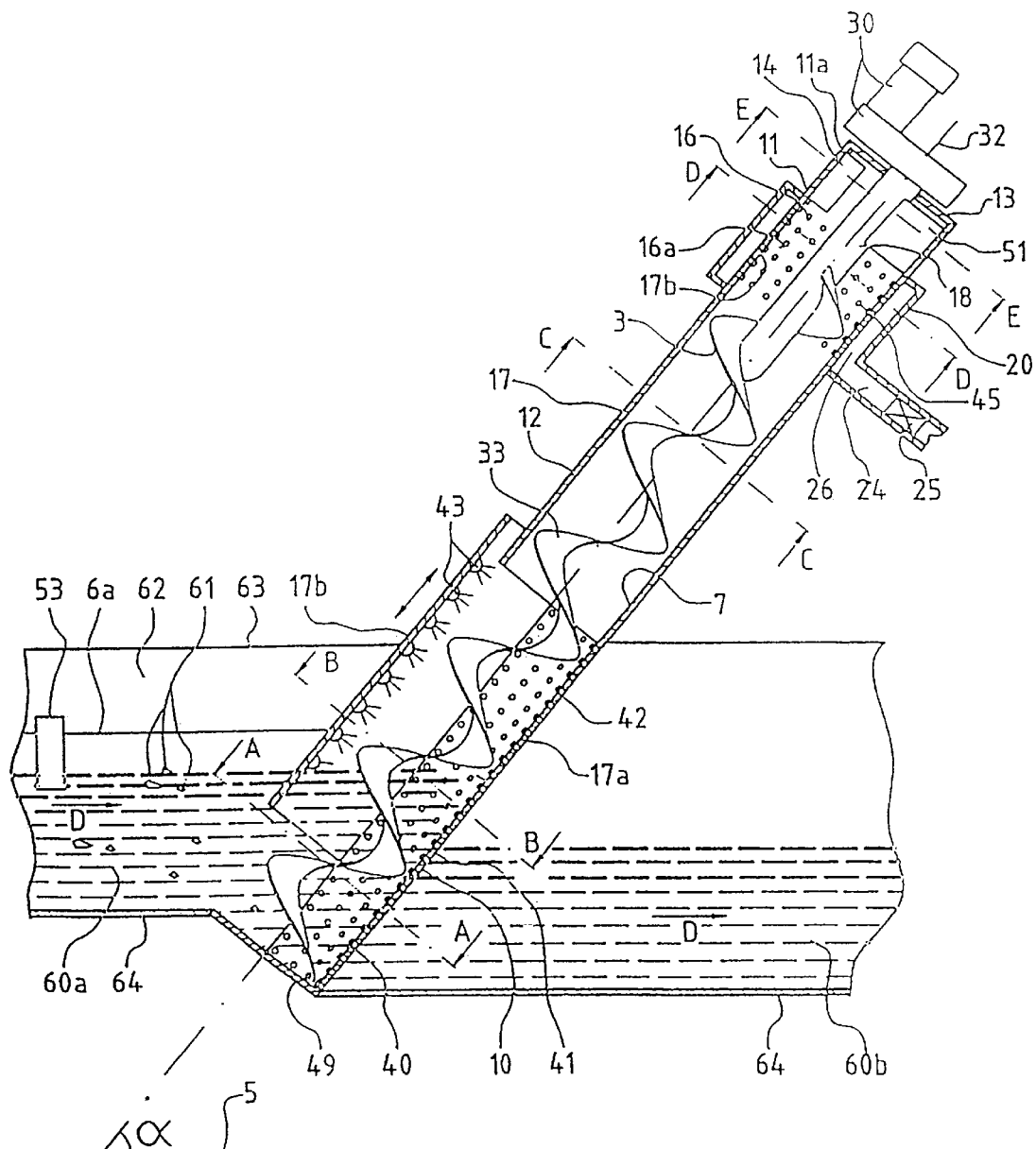
FIG. 1 shows a longitudinal section through an apparatus placed in a channel.
Figure 1A:
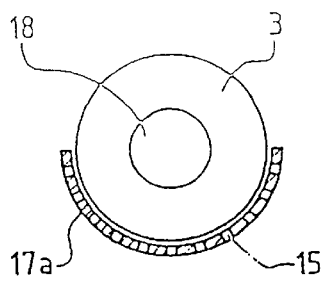
FIGS. 1a–e show cross sections taken along the lines A—A, B—B, C—C, D—D and E—E in FIG. 1.
Figure 1B:
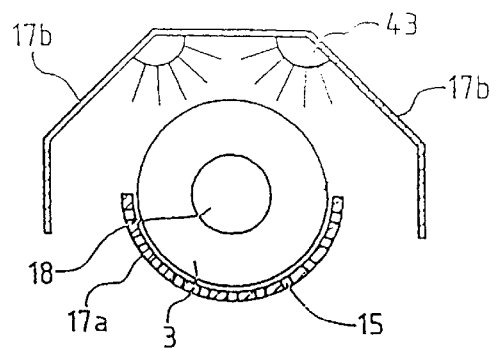

FIG. 1 also shows a channel 62 with an upper edge 63 and a channel bottom 64. Liquid 60a, 60b flows through the channel and passes through the screen device 40. The liquid level of the liquid 60a before passing the screen device is higher than the liquid level of the liquid 60b which has passed the screen device. The arrows D mark the flow direction of the liquids. The channel consists, for example, of a concrete or sheet gutter or flume in which the liquid flows.

Figure 1C:
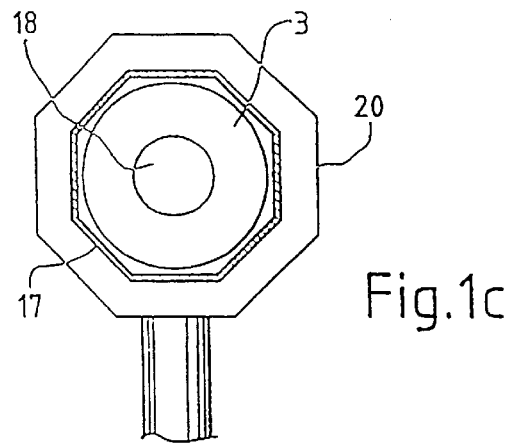
Figure 1D:
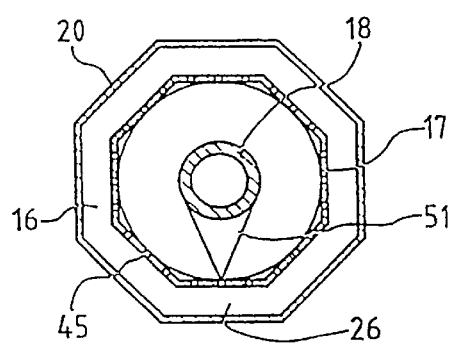
Figure 1E:
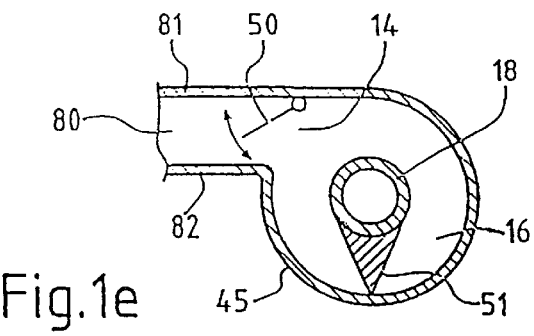

The wall 17a of the screen device merges in the upper region of the second portion 42 in the first casing 17 surrounding the conveyor helix 3 both in the intermediate portion 12 and in the upper portion 11. In the upper portion 11, the first casing 17 is surrounded, at least along a part of its length, by an outer casing 20. In certain embodiments, in order to increase the friction between conveyed material and the first casing 17, this is of a cross section with at least one corner. Often, use is made of a polygonal cross section, as shown in FIG. 1c. Embodiments also occur where the cross section is, for example, circular, oval, etc. The casing 17 is, in the upper portion 11, provided with passages 45 for liquid, while the intermediate portion 12 generally lacks such passages.

Figure 2:
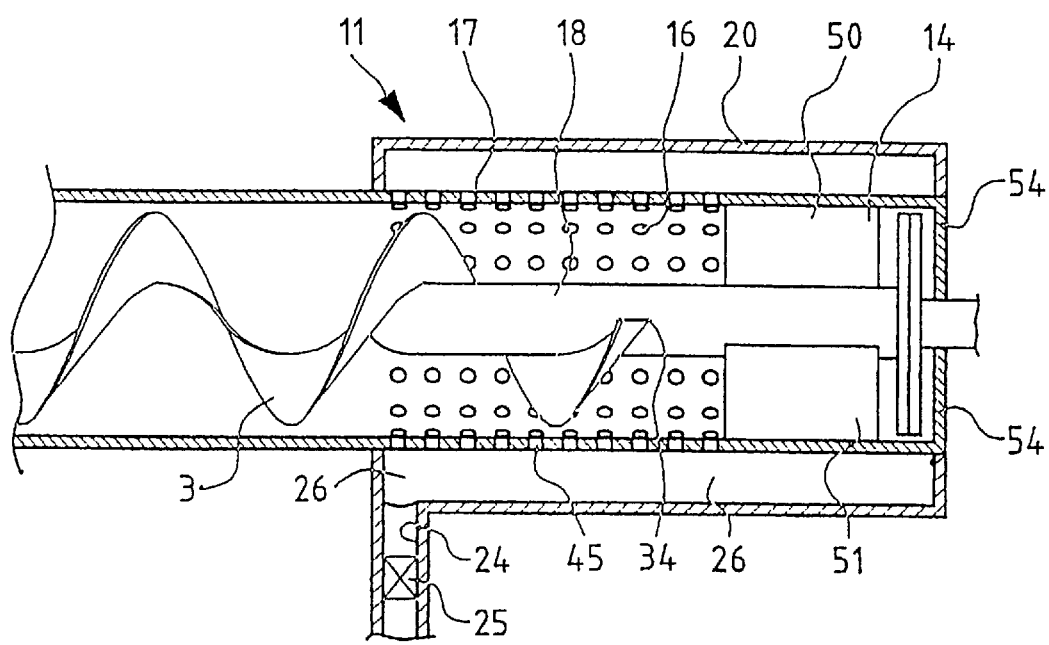
FIG. 2 shows the upper end portion of the apparatus in greater detail.

FIGS. 1–2 show a drive shaft 18 rotated by the prime mover 30, the shaft being fixed to the helix 3 in order to rotate it. The drive shaft enters at least half a helical turn into the helix 3. Between the upper end 34 of the helix and the end wall 54 of the apparatus, there is formed an area 16 without helix, hereinafter also designated helicalfree zone 16. The above-mentioned end will hereinafter often be designated "free end" 34. The first casing is provided with passages 45 for liquid in the region of the free end of the helix. This region preferably comprises only that portion of the casing which surrounds the three helical turns which precede the end 34 and, as a rule, only the last two helical turns. In the helical-free zone 16, the first casing is moreover generally provided with passages 45 in that portion 16a which is located between the end 34 of the conveyor helix and the discharge aperture 14.

The first casing has, in the area proximal the upper end wall 54 of the apparatus, a discharge aperture 14. This is generally provided with at least one hatch 50 for the controllable closing and opening, respectively, of the discharge aperture. Drive means (not shown in the Drawings) are provided for moving the hatch to the opened position, to the closed position or to an intermediate position.

The drive shaft 18 is, in the region of the discharge aperture 14, provided with a discharge device 51 fixedly connected to the shaft and, on rotation of the shaft, pushing accumulated screenings ahead of it in the circumferential direction of the first casing. The distance in the axial direction of the helical-free region around the shaft 18 to the discharge device 51 corresponds to at least approximately half of the diameter of the helix 3 and at most approximately twice the diameter. As a rule, the distance is not greater than the diameter of the helix 3.

The helical-free space which is formed around the drive shaft 18 from the free end 34 of the helix 3 and up to the upper end wall 54 of the discharge portion constitutes a compartment for temporary accumulation of upwardly conveyed screenings.

In the upper portion 11, the casing is provided with passages 45 for liquid while the intermediate portion 12 has no such passages. Between the outer casing 20 and the first (inner) casing 17, there is formed a space 26 for accumulating liquid which has been moved into the space via the passages 45. It will be obvious that, in other embodiments, the intermediate portion is also provided with passages, whereupon the outer casing 20 is extended downwards towards the screen device 40 in order to surround that part of the intermediate portion which is provided with passages. The compression of the screenings (as described below) in the upper portion 11 of the apparatus is sufficiently effective for the desired total solids to be achieved for the matter which is to be discharged out of the apparatus. The intermediate portion 12 is provided merely for the screenings to be lifted to suitable discharge height and is only a transport section for the screenings. Consequently, the intermediate portion normally lacks passages for liquid.

The cross section of the first casing 17 is, in the area along the helical-free portion between the free end 34 and the discharge device 51 preferably not circular, so as to prevent rotation of screenings accumulated in this region. In the area of the discharge device 51, the cross section is substantially circular.

The discharge aperture 14 is provided with an ejector chute 80. This has a first wall 81 which is disposed on one side of the discharge aperture 14 and directed in a tangential direction of the cross section of the casing. On the opposing side of the discharge aperture, the ejector chute is provided with a second wall 82 which is opposed to the first. Both walls are interconnected with transverse walls which are oriented such that the ejector chute will have a substantially rectangular cross section. As a rule, the distance between the first and second walls increases with increasing distance from the discharge aperture 14.

The discharge device 51 is in the form of a vane 51 which is permanently fixed at the drive shaft 18. The cross section of the vane is preferably conical, with the tip of the cone directed from the centre axis of the drive shaft. On rotation of the drive shaft, the tip of the cone passes with slight clearance the inner surface of the first casing.

As a result of the cross section of the discharge device 51, the device will, on its rotation past the area of the discharge aperture 14, act on matter which is abutting against the device with forces at a direction which substantially corresponds to the direction of the ejector chute. Hereby, displacement of matter out through the discharge aperture 14 will be facilitated.

In the embodiment illustrated in FIG. 3, FIGS. 3a–e and FIG. 4, there is disposed, in the lower portion 10 of the apparatus and in the intermediate portion 12, a central stationary mechanical shaft 19 which is fixed to the lower transverse wall (bottom wall) 49 of the apparatus. The shaft passes through the central cavity of the helix 3. The dimensions of the shaft are less than the diameter of the inner cavity of the helix. In certain embodiments, the shaft is designed with a circular cross section, while in other embodiments it has an oval cross section. There occur also embodiments in which the shaft is provided with external ribs and/or has a cross section with at least one corner.

FIG. 4 shows the upper portion 11 according to the embodiment illustrated in FIG. 3 in greater detail. As will be apparent from FIG. 4, the drive shaft 18 is not mechanically connected to the mechanical shaft 19. The length of the mechanical shaft 19 is selected such that the shaft terminates adjacent the rotary drive shaft 18.

The width of the thread blade 33 in the radial direction and the radius of the shaft are selected such that, when the shaft is inclining, the force of gravity will bring the thread blade into abutment against the wall 17a of the screen device 40 and/or against matter located between the thread blade and the wall 17a. Those parts of the thread blade which are located in the intermediate portion 12 are also displaced by gravity into abutment against the casing 17 and/or against matter located between the thread blade and the casing. In the area adjacent the first mechanical shaft 18, the spiral is free-running, i.e. there is no abutment against the first casing 17 of the apparatus or against the central mechanical shaft 19.

FIG. 5 shows one embodiment of the apparatus where there is no intermediate portion. The apparatus is placed in a container 2 with an inlet 21 and an outlet 22 which is provided with a valve (not shown in the Figure) for opening and closing the outlet. The container includes a chamber 2a which is supplied with liquid through the inlet 21, and a space 2b from which liquid is removed through the outlet 22. The wall 17a of the screening device 40 forms a partition 17a between the chamber 2a and the space 2b. A detector 53 is provided for sensing the liquid level in the chamber and moreover a control means (not shown in the figure) opens and closes the outlet valve when the liquid level reaches a predetermined lowest level and opens the outlet valve when the liquid level reaches a predetermined highest level. The outlet 22 of the container is dimensioned for a flow capacity which corresponds to or exceeds the flow capacity of the inlet 21.

FIGS. 6a,b show one embodiment in which the apparatus includes an extra screening device 70 provided with passages 15a for liquid, this device being hereafter generally referred to as extra screening portion 70 which is disposed beside the screening device 40. In the embodiment of FIG. 6a, which shows the apparatus from above, the screening device 40 is placed adjacent the one side wall 65 of the channel 62. The extra screening portion 70 is disposed between the second side wall 66 of the channel and the screening device 40. As a rule, the extra screening portion 70 makes an obtuse angle β with the upstream channel wall 66. Most proximal the bottom 64 of the channel, there is disposed between the screening device 40 and the second side wall 66 of the channel, a transverse wall 67 which is impenetrable for liquid (cf. FIG. 6b). The extra screening portion 70 connects to the upper edge 69 of the transverse wall. A scraper device (not shown in the Figures) is provided for displacing bodies which have accumulated against the extra screening portion towards the screening device 40.

A vertical wall 68 connects the extra screening portion 70 with the screening device 40. The lower portion 68a of the wall flush with the edge 69 is impenetrable for liquid, while its upper portion 68b is, in certain embodiments, designed as screening device.

The extra screening portion 70 is, as a rule, placed a distance from the bottom 64 of the channel. This distance is determined by the calculated size of normal flow through the channel and is selected such that liquid passes through the extra screening portion only when the flow in the channel exceeds a predetermined flow. There will hereby be achieved the positive effect that, on flow which is less than the predetermined flow, all liquid passes through the screening device 40. This is a factor which entails that the desired size of the flow, and thereby the desired minimum flow rate will be maintained through the screening device 40 even in the event of slight flow volumes. An increased flow prevents sedimentation ahead of the screening device.

The extra screening portion 70 with the wall 67, as well as the extra screening portion 68b with the wall 68a are, as a rule, of vertical extent in the liquid 60. The angle of inclination of the screening device 40 is, as a rule, 30–50° to the horizontal plane. The width of the screening device 40 open to the liquid flow is preferably approx. 30–50 cm and the majority of channels in treatment plants throughout the world seldom display widths exceeding 2.5 m. The majority of widths is less than 1.2 m. The screening device 40 and the screening portion 70 together cover the entire width of the channel and together offer an optimum screening surface for the onward flowing liquid. Great flexibility in respect of screening surface will also be attained in that the angle β may be permitted to vary without operation being jeopardized or without the design and construction being appreciably more expensive. In other words, the present invention affords the possibility of simple dimensioning of the screening surface in view of liquid flow and demands on the size of the screen aperture, at the same time as the screening device 40, the intermediate portion 12 and the upper portion 11 are permitted to be dimensioned according to calculated maximum quantity of screenings which need to be handled per unit of time.

In one embodiment (not shown in the Figures), the screening device is placed between the side walls 65,66 of the channel, extra screening portions being provided between the screening device 40 and the side walls 65,66 of the channel on both sides of the screening device.

FIGS. 7a,b show yet a further embodiment of the present invention in which extra screening portions 74 are provided between the screening device 40 and the walls of the channel on both sides of the screening device 40. The extra screening portions are placed vertically in a manner corresponding to that previously disclosed for the embodiment according to FIGS. 6a,b. The screening portions are vertically oriented and have a cross section which constitutes a portion of a circle periphery. The screening portions thus form partly cylindrical screening surfaces 75. A scraper device 71 is disposed on an arm 72 rotatably about a vertical shaft 73. While this embodiment is shown with two extra screening portions, it will be obvious to a person skilled in the art that, in other embodiments, only one extra screening portion is included which is placed corresponding to that shown in FIG. 6a.

FIGS. 8a,b show still a further embodiment of the extra screening device 70. In FIG. 8a, which shows the extra screening device from above, this is disposed between the second side wall 66 of the channel, and the screening device 40 which is placed adjacent the opposed side wall 65. The extra screening device 70 includes a cylinder 70 rotary about its centre axis and whose circumferential surface is provided with perforations or apertures 15a so as to form a screening surface 77 through which liquid flowing in the channel may pass. The centre axis of the cylinder is substantially vertically oriented. The cylinder 70 is disposed to rotate in such a direction that material entrapped on its front side (the side facing towards the liquid flow) is displaced on rotation of the cylinder substantially horizontally in a direction towards the inclining screening device 40.

A scraper device 76 oriented in the axial direction of the cylinder 70 is disposed adjacent the circumferential surface of the cylinder and is placed such that material scraped off falls down upstream or towards the screening surface which is formed by the wall 17*a* of the screening device 40.

In certain embodiments, there is disposed most proximal the bottom 64 of the channel and between the screening device 40 and the second side wall 66 of the channel, a "box" 79 which is impenetrable for liquid and whose upper surface 69 is in conjunction with the bottom periphery 78 of the rotating cylinder 70. In major liquid flows, the advancing liquid passes both through the circumferential surface of the cylinder and through the screening device 40. The box 79 has, as a rule, a wall 68*a* which faces counter-currently and which corresponds to the above described lower portion of the vertical wall 68 which is impenetrable for liquid. The wall 68*a* of the box is of an orientation which entails that there is formed, between the wall 66 of the channel and the wall of the box, an obtuse angle corresponding to the angle Δ previoiusly defined in this description. The design of the box entails that, in a manner corresponding to that disclosed above, there is formed upstream of the screening device a flow path tapering towards the screening device 40 for the flowing liquid. This design of the box entails the advantage that the flow rate is maintained even in small flow volumes and that the risk of sedimentation is reduced during those periods when the liquid flows are slight.

The design with the rotary screening cylinder in acordance with the foregoing entails that liquid passes through the circumferential surface of the cylinder in both directions, i.e. also from inside and out, which gives the possibility of auto-cleaning of the apertures in the circumferential surface. Extra cleaning of the apertures of the cylinder when they are located on that side of the cylinder which is downstream, is provided in certain embodiments by means of vertically fixed nozzles 43 which spray liquid against the inside of the circumferential surface of the cylinder. There are also embodiments in which cleaning devices (not shown in the Figures), such as brushes or scrapers remove residual matter from the outside of the cylinder when its circumferential surface passes the cleaning devices.

A person skilled in the art will readily perceive that, in wide channels, the including screening device 40 is placed centrally in the channel with one screening cylinder 70 on both sides of the screening device, the screening cylinders forming extra screening portions in the apparatus.

When liquid containing those bodies, particles and/or similar impurities 61 which are to be removed from the liquid (hereinafter also referred to as solid substances) flows through the channel, the solid substances occurring in the liquid are arrested against the wall of the screening device 40 when liquid passes through the passages 15. On rotation of the helix, the accumulated solid substances are displaced along the path 7 of the apparatus up to the upper portion 11 of the apparatus in order there to be discharged out of the apparatus through the discharge aperture 14.

In those embodiments where the apparatus is provided with a displaceable casing half 17*b* which is preferably provided with nozzles for liquid jets, the purpose of the casing is to ensure efficient inward transport of screenings floating on the liquid surface and, at the same time, to render the upward transport operation more efficient.

In those embodiments where outlet devices (nozzles) 43 spray liquid jets against screenings displaced in the path 7, soluble impurities in the liquid (for example biological impurities) which adhere to bodies and/or particles included in the screenings are released by the action of being sprayed by liquid. This liquid spraying also entails that the bodies and/or particles are moved towards the wall of the screening device 40, which improves efficiency in the transport by the helix 3 of the bodies and/or particles.

On displacement of accumulated matter towards the upper portion of the path 7, a plug of matter will progressively be built up when the hatch 50 is closed, this plug being compressed between the drive shaft 18 and the first casing 17 in the helix-free space most proximal the upper end of the upper portion 11. Matter which is accumulated in the area of the vane 51 accompanies the vane in its rotation. When the plug is finally formed, continuous adhesion takes place to the plug according as the helix 3 advances matter and its free end 34 compresses matter against the plug. The requisite pressure to open the hatch does not occur until sufficient material has accumulated in the region between the upper end 34 and the discharge device 51. Even when the hatch 50 has been opened and the helix exercises pressure on the plug, the plug will generally remain substantially intact in its end located most proximal the helix, while matter in the opposite end of the plug will be broken loose from the plug in connection with the discharge through the discharge aperture 14.

Most of the liquid is pressed out in a relatively restricted region located on both sides of the upper end 34 of the helix 3. This portion is of a length which is at least roughly half of the outer helical diameter of the helix.

On compression of the material, the quantity of the liquid absorbed in the material is reduced. The liquid departs from the region inside the first casing 17 through those passages 45 which are provided in the wall of the first casing. The degree of compression determines the size of the reduction of the liquid content of the matter, and thereby the total solids of the material passing through the discharge opening 14. The degree of compression is controlled by the force which is required to open the hatch. The apparatus is provided with control means for adjusting the requisite force.

The more screenings accumulated, the greater will be the force which the helix applies against the matter pressed into the space, and the better will be the degree of dewatering of the arriving material. The increasing compression of the screenings entails that a steadily increasing torque is required to rotate the helix 3 fixedly connected to the drive shaft 18 and the discharge device 51. An automatically operating regulation of the opening and closing of the hatch, and thereby of the liquid content of the screenings or the compression will be obtained in that the hatch 50 of the discharge opening 14 is pretensioned, for example mechanically or pneumatically.

In a first embodiment of the apparatus, the degree of compression of the material is adjusted by setting (e.g. by modifying the pretensioning of the spring) of the total force which the matter is to apply against the hatch in order for this to be opened or closed.

In a second embodiment, the degree of compression is adjusted in that a device (e.g. a hydraulic piston, a pneumatic piston, an electro-mechanical operating device, etc.) opens or closes the hatch when the driving power for rotating the helix passes a pre-set value (as a rule the current strength is measured).

In all embodiments, it is simple, even during ongoing operation of the apparatus, to adapt the adjustment settings and thereby the degree of compression in response to the properties of the matter which is to be compressed and the total solids level which is required. By adjusting the degree of compression, the desired total solids will be achieved in the matter in the formed plug and thereby in the matter which is fed out through the discharge opening 14. Total solids levels exceeding 20% and, as a rule 25%, will be achieved for most types of matter. In normally occurring fibrous screenings, total solids contents exceeding 35% may be achieved.

The total force which is required to displace the plug towards the discharge device determines the total solids of the matter which is discharged out of the apparatus. On increase of the total force, the degree of compression increases and thereby the total solids of the material which is discharged out of the apparatus.

In the foregoing description, it has been disclosed that the apparatus includes an intermediate portion 12. However, this constitutes merely a conveyor portion whose length is adapted in response to the level at which the discharge of the matter out of the apparatus is to take place. Since the technical effect of the apparatus is only dependent upon the lower portion 10 of the apparatus and the upper portion 11 of the apparatus, certain embodiments lack the intermediate portion 12.

The foregoing description included an account of the provision and utilization of an extra screening surface 70,74. The advantage inherent in this extra screening surface is that it makes it possible to create an expedient screening device for major liquid flows where the screenings, in the dewatered state and satisfactorily freed from soluble impurities is delivered.

The above-described combination of screening device 40 and extra screening portions 70,74 makes it possible to dimension the size of the total screening surface in view of the largest and smallest liquid flow and, regardless of this factor, to dimension the transport capacity of the screening device 40, the intermediate portion 12, and the upper portion 11 in accordance with the expected quantity of screenings per unit of time. Despite the increase of the permitted maximum liquid flow which the extra screening devices made possible, the size of the flow area in minimum flow will remain unchanged. The described embodiments with extra screening portions offer efficient screening combined with horizontally directed advancement of entrapped screenings to the inclined screening device 40. FIGS. 6a,b show one embodiment in which, for example the dimensioning of the apparatus, the extra screening surface 70 and thereby the permitted maximum liquid flow may readily be increased by altering the angle β between the extra screening portions and the wall or walls 65,66 of the channel. When the screening surfaces need to be provided with small apertures, the reduced flow areas of the screening surfaces is compensated for by an increase of the obtuse angle β between the extra screening device 70 and the channel walls 65,66.

According to prior art techniques, problems often occur in the accumulation of sedimented matter ahead of the screen grid in channels at, for example, water treatment plants. The accumulation is because the channels are dimensioned to handle flows of greatly varying sizes. The channels are dimensioned to permit large maximum flows, at the same time as, during long periods of time, the flows may be very small. In the event of very small flows, the flow rate is extremely low, for which reason matter sediments ahead of the screen grid of the channels. As a result of the present invention, the problem inherent in sedimented matter is eliminated in that the flow rate ahead of the grid is maintained even in the event of small flows in the channel, because the tight wall portion 67 beneath the extra screening surface 70 concentrates the flow such that liquid only passes through the passages 15 of the screening device 40.

The above-detailed description has referred to but a limited number of embodiments of the present invention, but a person skilled in the art will readily perceive that the present invention encompasses a large number of embodiments without departing from the scope of the appended claims.

What is claimed is:

1. Apparatus for removal of solid and semi-solid material from a liquid flowing in a channel, said apparatus comprising a conveyor including a conveyor helix rotatable about an axis inclined to the horizontal, and a casing at least partly surrounding the conveyor helix, said conveyor having a lower portion extending into said channel, said casing being perforated in said lower portion to form a screening device to separate solid and semi-solid material from the liquid passing through the screening device so that the solid and semi-solid material can be transported upwardly by the conveyor helix, said conveyor further including an upper portion at which the solid or semi-solid material is discharged, and at least one further screening device extending from said conveyor across said channel, said further screening device comprising a wall having an imperforate wall portion and a perforate wall portion, said imperforate portion being connected to said casing and extending to a bottom of said channel, said perforate portion being confined to an upper portion of said wall in an upper part of said channel.

2. The apparatus as claimed in claim 1, comprising a mechanical device for separating solid and semi-solid material on said further screening device and displacing said material to said conveyor.

3. The apparatus as claimed in claim 1, wherein said wall of the further screening device has an end connected to said casing and an opposite end connected to a side wall of said channel.

4. The apparatus as claimed in claim 3, wherein said wall of the further screening device forms an obtuse angle with said side wall of the channel.

5. The apparatus as claimed in claim 1, wherein said wall of the further screening device has a cross-section which is at least partly circular.

6. The apparatus as claimed in claim 1, further comprising a discharge aperture at said upper portion of the conveyor, a mechanical abutment for controlled opening and closing of said discharge aperture, said conveyor helix terminating at a distance from said discharge aperture to provide a helix-free zone between an upper end of the conveyor helix and an upper end wall of said casing, said helix-free zone including a portion located between said upper end of the conveyor helix and said discharge aperture in which passages for liquid are provided in said casing.

7. The apparatus as claimed in claim 6, comprising a drive shaft for said conveyor helix, said drive shaft projecting into the conveyor helix by at least one-half of a turn of the helix.

8. The apparatus as claimed in claim 7, comprising nozzles positioned to spray water from above into said casing of the conveyor.

9. The apparatus as claimed in claim 1, comprising a stationary mechanical shaft disposed centrally in the conveyor helix, said stationary shaft terminating a predetermined distance from an upper end wall of the apparatus.

10. The apparatus as claimed in claim 1, comprising a switching device for controlling direction of rotation of the conveyor helix for displacement of accumulated material from or towards said lower portion of the conveyor.

11. The apparatus as claimed in claim 6, wherein said mechanical abutment includes a mechanical device for opening and closing said discharge aperture depending on size and quantity of accumulated material producing a force acting on the mechanical device.

12. The apparatus as claimed in claim 1, wherein said wall of the further screening device integrally incorporates said imperforate portion and said perforate portion, said perforate portion constituting a portion of said wall located at a distance from said casing of said conveyor.

13. The apparatus as claimed in claim 12, wherein said perforate portion of the wall is located at a distance above a bottom of the channel so as to function as said further screening device when a determined liquid flow prevails in said channel.

14. The apparatus as claimed in claim 13, wherein the imperforate portion of the wall connects said wall to the channel and to the casing of the conveyor.

\* \* \* \* \*

UNITED STATES PATENT AND TRADEMARK OFFICE
CERTIFICATE OF CORRECTION

PATENT NO. : 6,096,201  
DATED : August 1, 2000  
INVENTOR(S) : Richard L. Bruke Page 1 of 1

It is certified that error appears in the above-identified patent and that said Letters Patent is hereby corrected as shown below:

<u>Title page,</u>
Item [73], "Spirac Engineering AB, Malmo" should read -- Spirendus AB, Limhamn --.

Signed and Sealed this

Fifth Day of February, 2002

Attest:

Attesting Officer

JAMES E. ROGAN
*Director of the United States Patent and Trademark Office*